Feb. 6, 1940.  F. H. SCHOENFELD  2,189,594

FILTER DEVICE FOR CONTROL VALVES

Filed March 15, 1937

INVENTOR
FRANK H. SCHOENFELD
BY John Harrow Leonard
ATTORNEY

Patented Feb. 6, 1940

2,189,594

UNITED STATES PATENT OFFICE 2,189,594

FILTER DEVICE FOR CONTROL VALVES

Frank H. Schoenfeld, Cleveland Heights, Ohio

Application March 15, 1937, Serial No. 130,857

4 Claims. (Cl. 183—67)

This invention relates to a filter device for control valves. An object of the invention is to provide a filter device for control valves or thermostatically operated valves such as described and claimed in my United States Letters Patent No. 2,063,465, issued December 8, 1936, and in my copending application Serial No. 46,543, filed October 24, 1935, which will filter and segregate foreign matter from the operating parts of the valve.

An object of the present invention is to so position the filter device that it will intersect the path of travel of the fluid immediately after it leaves the inlet passage and which will segregate the inlet passage from the valve and valve seat.

A specific object is to provide a filter device of this nature which will filter the fluid immediately after it enters the inlet passage and before it passes into the chamber of working parts of the valve to insure perfect operation of the moving parts by the elimination of foreign matter therefrom in order that the valve may operate efficiently and be dependable.

A further object is to so construct a filter device to prevent foreign matter from passing into the chamber of working parts and clog or become lodged upon the filter element to impede the flow of fluid therethrough.

Another object is to provide an annulus of solid material having an opening therein for a filter element exposed away from the direction of introduction of fluid and which will protect the working parts of the valve from becoming damaged from foreign substances and objects.

Another object is to so construct such a device that it may be economically manufactured and conveniently and accurately installed within the valve housing.

Other objects will become apparent from the following description which relates to the drawing, in which:

Fig. 2 is a vertical sectional view taken along the line 2—2 of Fig. 1;

Figure 1:
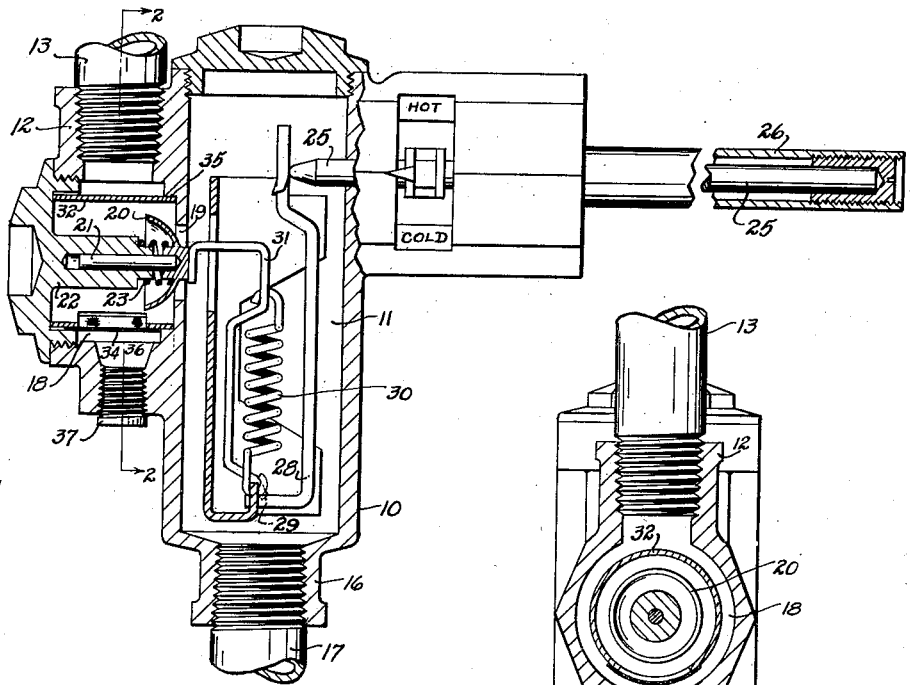
Fig. 1 is an elevational view partly in section of an assembled control valve with the filter device in place.

Control valves such as illustrated in the drawing and in my copending application must necessarily operate automatically and effectively in opening and closing the valve to open and close the gas supply and must be dependable in its operation. The control valve illustrated is primarily used as a thermostatic control for hot water systems and will not operate efficiently unless fluid or gas is filtered due to the fact that foreign substances contained in the gas will become lodged upon the valve plug and valve seat which will allow the gas to pass to the outlet passage even though the working parts of the valve be in the off position. It is evident that this is dangerous, in the above mentioned type of systems, in that gas would be permitted to pass to the burner even though the water tank reaches the desired and in some cases a dangerous temperature.

In the drawing the temperature control valve is designated generally 10 and comprises a body or housing having an operating mechanism cavity 11 and a threaded boss 12 into which an inlet pipe 13 is fitted and a threaded boss 16 into which an outlet pipe 17 is fitted. The body 10 is provided with a horizontally extending supplemental cavity portion 18 having a valve seat 19 machined in the end wall between the cavity 11 and the cavity 18. Within the supplemental cavity 18 is a valve plug 20 having a valve stem 21 which is slidably mounted in the closure cap 22 which is opposite to and aligned with the seat 19 and the said end wall. The valve plug 20 is normally held in the closed position by means of spring 23 which is shown as carried by the closure cap 22 and which bears against the head of the valve plug 20.

As described in the above identified copending application and patent, upon retraction of the thermostatic bar 25 caused by its tube 26 expanding due to an increased temperature, the lower end of the lever 28 is swung to the left of the position shown in Fig. 1 carrying knife-edged pivots 29 to the left of the anchor point of the spring 30 with the result that the upper end of the lever 31 is swung to the right and out of contact with the valve plug 20, whereupon the valve plug contacts and seats in the valve seat 19 shutting off the gas supply due to the expansion of the spring 23.

From the foregoing description it is apparent that the working parts of the above described valve must at all times be in perfect operating condition and free from the foreign substances usually contained in gas and other fluids, in order to be dependable in action. In order to insure perfect operation of these parts and as heretofore stated, it is necessary to filter the foreign substances from the gas immediately after it enters the valve and before it comes in contact with any of the working parts. It is not only necessary that the foreign substance be thoroughly removed from the gas but the clogging of the filter elements in passages through the valves must be eliminated to prevent the impeding of the flow of gas therethrough.

For this purpose an annular filter sleeve 32 is provided having an opening 33 at the bottom and a filter screen or element 34 covering the opening is suitably secured thereto. The filter sleeve 32 is open at the ends and one end is press-fitted into the end wall of the cavity 18 as at 35, the opposite open end of the sleeve 32 being sealed by means of the closure cap 22. It will be noted (Figs. 1 and 2) that the peripheral wall of the filter sleeve is in spaced relation to the wall of the cavity 18 and is coaxial with the valve seat 19 and normal to the inlet passage or flow of gas and will intersect the path of travel of the gas from the inlet passage and segregate the inlet passage from the seat.

In order for gas to enter the main chamber of the valve it is necessary that it pass or be directed along the peripheral surface of the sleeve 32 and then pass upwardly through the filter element 34 into the interior of the sleeve and thence to the valve seat and main cavity of the valve to the outlet passage. By this arrangement any foreign substances such as dust, grit, sludge, and so forth, contained in the gas will be removed by gravity before they have the opportunity to enter the supplemental cavity 18 and will drop into the cavity 36 or be retained by the filter element 34 and then drop into the cavity 36. The drain plug 37 is provided for the removal of the foreign substances from the cavity 18 and also for the cleaning of the filter element 34.

In the arrangements illustrated the filter devices may be easily removed to allow for the cleaning or replacement of the device by removal of the closure cap 22 and the removal of the device from the cavity 18.

Figure 4:
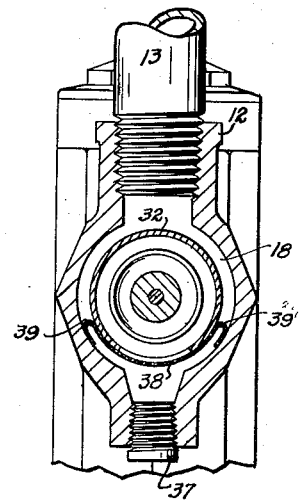
Fig. 4 is a vertical sectional view similar to Fig. 3 showing a modified form of my filter device.
Figure 3:
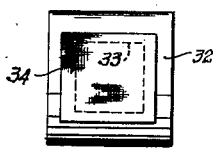
Fig. 3 is a bottom plan view of the filter device.

In the modified form of the filter device illustrated in Fig. 4 the filter sleeve 32 is assembled in the supplemental cavity 18 in the same manner as the above described filter device. The filter element 38 covers and overlies the opening 33 in the sleeve 32 and is suitably secured thereto and is bent back as at 39 to contact the supplemental cavity 18 and bridges from the sleeve 32 across the annular passage between the sleeve and supplemental cavity.

In this form of filter device the gas or fluid in order to pass into the main cavity 11 must first pass around the outer surface of the sleeve 32 and filter through the portions 39 and then through the filter elements 38 into the interior of the sleeve 32 and thence to the valve seat and cavity 11. Thus a double filtering action is provided by the filter portions 38—39.

Figure 5:
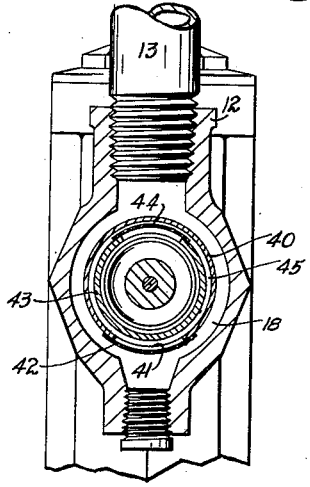
Fig. 5 is a similar vertical sectional view illustrating still another modification of my device.

Still another modification of a filter device is illustrated in Fig. 5 wherein a double filtering action is obtained. In this form an outer filter sleeve 40 having an opening 41 in the bottom thereof and a filter element 42 overlying the opening is provided, the inner filter sleeve 43 having an opening in the top and a filter element 44 overlying the opening is positioned within the sleeve 40 in spaced relation thereto as at 45.

The gas enters the inlet passage 15 and passes downwardly around the outer periphery of the sleeve 40 and then upwardly through the filter element 42 into the passage 45 between the inner surface of the sleeve 40 and the outer surface of the sleeve 43 and finally downwardly through the filter element 44 to the valve seat 19. Any foreign matter that does not filter through the gas during the downward travel around the sleeve 40 and through the filter element 42 will be filtered during the upward travel around the sleeve 43 and through the filter 44.

The foreign substance may be removed from the filter device and supplemental passages 18 of the devices illustrated in Figs. 4 and 5 in the same manner as in the device illustrated in Figs. 1 and 2.

It will become apparent from the foregoing description that filter devices of this nature may be cheaply and easily installed in control valves without material change in design of the valve. They may also be adapted to valves not provided with filter devices without material change or machining, to not only increase the efficiency of the valve but also to increase the dependability and safety of the entire apparatus.

Various modifications and alterations may be made in the particular construction without departing from the spirit and scope of my invention as defined in the appended claims.

Having thus described my invention, what I claim is:

1. A fuel gas filter for an automatic fuel gas control device, which device includes a housing having an inlet chamber with an inlet opening in its side wall, said housing being mounted on a partition wall which separates the inlet chamber from the control chamber and having an orifice with its axis substantially at right angles to the inlet opening, and said filter comprising a sleeve disposed in the inlet chamber and being closed at one end by abutting the partition wall, said sleeve being closed at the opposite end and being spaced inwardly from the side wall of the inlet chamber to provide a fuel passage between the side wall of the sleeve and the side wall of the inlet chamber, thereby defining an isolated inner chamber in the inlet chamber, said sleeve having a port in its side wall and positioned opposite to the inlet opening whereby gas entering the inlet opening is completely reversed in its direction of movement after passing through the inlet opening and before reaching the port in the sleeve for extracting solid matter from the fuel by centrifugal action, a filter element overlying the port for extracting additional solid matter entrained in the fuel as the fuel passes into the inner chamber, and a cavity located in the side wall of the inlet chamber and in alignment with the port in the sleeve and in communication therewith for receiving the extracted solid matter.

2. A fuel gas filter comprising a housing having a main chamber, a sleeve in the main chamber and spaced from a wall of the main chamber for defining a passage for fuel around the outside of the sleeve, a port in the sleeve, said main chamber having an inlet opening connecting with said passage adjacent the side of the sleeve which is opposite from the port, said main chamber having an outlet opening in a wall thereof, said sleeve being closed at one end by abutting the wall of the main chamber around the outlet opening and being closed at the other end, and thereby defining an inner isolated chamber, said outlet opening being unconnected to said passage and connected to the inner isolated chamber of the sleeve, and a filter element having a portion entirely covering said port.

3. A fuel gas filter comprising a housing having a main chamber, a sleeve in the main chamber and spaced from a wall of the main chamber for defining a passage for fuel around the outside of the sleeve, a port in the sleeve, said main chamber having an inlet opening connecting with said passage adjacent the side of the sleeve which is opposite from the port, said main chamber having an outlet opening in a wall thereof, said sleeve being closed at one end by abutting the wall of the main chamber around the outlet opening and being closed at the other end, and thereby defining an inner isolated chamber, said outlet opening being unconnected to said passage and connected to the inner isolated chamber of the sleeve, and a filter element having a portion entirely covering said port and having portions extending across the passage and engaging the adjacent wall of the main chamber.

4. A fuel gas filter comprising a housing having a main chamber, an outer sleeve in the main chamber and spaced from a wall of the main chamber and thereby defining a passage for fuel around the outside of the sleeve, a port in the outer sleeve, said main chamber having an inlet opening connecting with said passage adjacent the side of the outer sleeve which is opposite from the port, and said main chamber having an outlet opening in a wall thereof, said outer sleeve being closed at the end adjacent the outlet opening by abutting the wall of the main chamber around the outlet opening and being closed at the other end and thereby defining an inner isolated chamber, a filter element having a portion entirely covering said port, an inner sleeve within and spaced from the side wall of the outer sleeve, said inner sleeve being closed at the end adjacent the outlet opening by abutting the wall of the main chamber around the outlet opening and being closed at the opposite end, and said inner sleeve having a port disposed at the side opposite the port of the outer sleeve, said outlet opening being unconnected to said passage and to the space between the sleeves and connected to the interior of the inner sleeve.

FRANK H. SCHOENFELD.